United States Patent [19]

Kebabian

[11] 3,829,670

[45] Aug. 13, 1974

[54] DIGITAL FILTER TO REALIZE EFFICIENTLY THE FILTERING REQUIRED WHEN MULTIPLYING OR DIVIDING THE SAMPLING RATE OF A DIGITAL SIGNAL BY A COMPOSITE INTEGER

[75] Inventor: Paul L. Kebabian, Cambridge, Mass.

[73] Assignee: Massachusetts Institute of Technology, Cambridge, Mass.

[22] Filed: Apr. 10, 1972

[21] Appl. No.: 242,807

[52] U.S. Cl. .................................. 235/152, 328/167

[51] Int. Cl. .......................... G06f 7/38, G06f 15/34

[58] Field of Search ............. 235/152; 328/165, 167

[56] References Cited

UNITED STATES PATENTS

| | | | |
|---|---|---|---|
| 3,506,813 | 4/1970 | Trimble | 235/152 |
| 3,522,546 | 8/1970 | Jackson et al. | 328/167 |
| 3,636,333 | 1/1972 | Klund | 235/156 |

OTHER PUBLICATIONS

L. B. Jackson et al., "An Approach to the Implementation of Digital Filters," IEEE Trans. on Audio & Electroacoustic, Vol. AU-16, No. 3, Sept. 1968, pp. 413–421.

*Primary Examiner*—Malcolm A. Morrison
*Assistant Examiner*—David H. Malzahn
*Attorney, Agent, or Firm*—Arthur A. Smith, Jr.; Robert Shaw; Martin M. Santa

[57] ABSTRACT

A digital filter employing a plurality of unit cells connected in cascade. Each unit cell includes a duplicating filter (typically a plurality of boxcar integrators connected in cascade). A switch is connected between the output of each duplicating filter and the output of the unit cell of which it is a part. The switch is operable to reduce the data rate to a sub-multiple of the input data rate to the associated duplicating filter, the sub-multiple being equal to the parameter R of the duplicating filter, where R is the number of points in the boxcar integrator impulse response when the duplicating filter is composed of boxcar integrators. In another form the switch is placed between the input to the unit cell and the input to the duplicating filter to increase the data rate and R in this latter situation is the multiple by which the data rate is increased. Two or more digital filters wherein the rate is reduced may be combined to form a band-pass filter or a bank of band-pass filters.

5 Claims, 9 Drawing Figures

DIGITAL FILTER TO REALIZE EFFICIENTLY THE FILTERING REQUIRED WHEN MULTIPLYING OR DIVIDING THE SAMPLING RATE OF A DIGITAL SIGNAL BY A COMPOSITE INTEGER

The present invention relates to digital filters and, in particular, to filters in which the output data rate is changed to a sub-multiple or a multiple of the input data rate.

A digital filter is a device operable to form a weighted average of a time-series of input numbers or to interpolate between numbers in a time-series. While binary numbers are not required for operation of such a system, in fact, binary numbers are the type ordinarily operated upon by the filter. In the system discussed in greatest detail herein the data (sampling) rate of the output is a sub-multiple of the input data rate. Conventional digital filters do not change the data rate, but rather, the latter function is accomplished by a separate rate reducer. Such conventional digital filters thus require a larger number of parts than the digital filters described herein. The digital filter of the present invention accomplishes the reduction as a series of smaller reductions, whose product equals the total reduction, by employing a number of unit cells connected in cascade, each unit cell being a module of which the filter is made. The modular-type fabrication thus allowed permits integration of the entire unit cell into a single chip of silicon. Even when discrete components are employed the modular construction is still employed with accompanying economies in fabrication.

The signal to be filtered may, for example, be the output of a digital voltmeter, or it may be the output of a stellar interferometer, the latter being the use in connection with which the present concepts have been tested. The work is reported in Nos. 101, (published on or about May 21, 1971), 103 (published on or about Nov. 24, 1971) and 104 (published on or about Mar. 8, 1972) of the Quarterly Progress Report of the Research Laboratory of Electronics (Massachusetts Institute of Technology) and hereby incorporated herein by reference, and in the doctoral thesis of the present inventor, deposited in the M.I.T. library system on or about June 27, 1972. The thesis is entitled "Duplicating Filters: A Class of Digital Filters With an Invariance Property." The signal of the interferometer consists of a sequence of 10-bit binary numbers occurring at 10KC rate. The purpose of the filter is to remove that part of the scintillation noise which appears in said output but which does not overlap the signal band so that the signal and the remaining noise (which is not removable) can be recorded for later use. It should be noted, in this connection, that in the filtering process the output of the interferometer containing $10^5$ bits/second can be reduced to 1,250 bits/second thereby reducing the speed of the recording means. By using the present filter made up a cascade of identical unit cells, the required filtering is obtained at only about half the cost of a directly realized filter and, moreover, the wiring is simpler in the present device because each unit cell is like the other. Thus, each unit cell can be made on a small printed circuit card and the cards can be wired together to make up a filter of any size; that is, the present filter is a modular-type structure, which can be made up of a number of identical modules. This then brings out a principal advantage: the modules can each be formed on a single silicon chip.

Filters of the present type are useful, generally, whenever a narrow, lowpass signal is to be separated from a much wider band of noise, and the result transmitted at a low bit rate. Whenever such a situation arises, this filter will do the job very economically compared to a conventional digital filter, especially if it is integrated onto a single chip of silicon; and as mentioned, the instant filter is far more suitable for such integration than is a conventional digital filter.

Another important use is in connection with low frequency spectral analysis. It is difficult to build suitable analog filters for low frequencies (e.g., ~10Hz and less). On the other hand, digital filters are especially advantageous because of their low power consumption at low frequencies when low power digital logic such as complementary MOS is used. The present device permits a single digital filter of conventional design to be multiplexed to cover an arbitrarily large number of octaves below its normal operating frequency. This can be done because each stage of the multistage system of the filter (1) divides the data rate by an integer, which will usually be two, and (2) filters the signal so that, to a specified tolerance, there is no aliasing of signals from other bands into the output.

Bandpass filters can also be made by combining the outputs from several chains of duplicating filters. Although the variety of frequency responses is limited, the filters can be made very simply and economically, and this is an important consideration where the simpler frequency response is acceptable.

An important commercial use for the present filters is in the area of process control. Reasons for this are that the signals occurring there are usually low frequency, and frequently must be separated from a large amount of high frequency noise. Because of the trend to the use of small computers for process control, the signals often are either digital to start with (for instance, the output of a tachometer or a digital shaft angle encoder) or are converted to digital form by a converter located at the transducer (for instance, a ph electrode with a digital voltmeter to detect its output). In these cases, digital low pass filtering at the signal source has the advantages of (1) allowing more signals to be sent over a given amount of cable, thereby reducing the cost of cables, repeaters, switching, etc., and (2) the computer does not need to filter the signals; thus, a smaller computer can be used, or the same computer can control more functions. When the signal originates in digital form, digital low pass filtering is the only reasonable method. When the signal is originally analog, digital filtering has the advantages: of better stability for the very low frequency signals involved and of being able to use the outputs of standard instruments, such as for example digital voltmeters, without the need to modify those instruments.

Accordingly an object of the present invention is to provide a digital filter adapted to reduce the data rate in the course of its operation to some sub-multiple of the input rate.

Another object is to provide a digital filter adapted to increase the data rate in the course of its operation to some multiple of the input rate.

Still another object is to provide bandpass and other digital filters made up of combinations of the above filters.

A further object is to provide a filter susceptible of modular construction especially in the form of integrated unit cells, the filter being made up of a plurality of such cells connected in cascade.

Other and still further objects will be evident in the explanation to follow and will be particularly pointed out in the appended claims.

By way of summary, the objects of the invention are attained in a digital filter that includes a plurality of unit cells connected in cascade, each unit cell including a duplicating filter and a switch. The switch is connected either between the output of the duplicating filter and the unit cell of which it is a part or between the input of the duplicating filter and the unit cell of which it is a part, depending upon whether the digital filter is intended respectively to reduce or increase the data rate, the corresponding change in data rate being related to the input data to the associated filter by a submultiple or a multiple, as the case may be. The relationship maintained is equal to the parameter R (i.e., the sampling rate change) as hereinafter defined.

The invention will now be discussed with reference to the accompanying drawing in which:

FIG. 5 is a figure similar to FIG. 1 but whereas FIG. 1 shows a switch connected between the last boxcar integrator and the output of the cell, FIG. 5 shows the switch between the input to the cell and the input to the first boxcar integrator;

Figure 1:
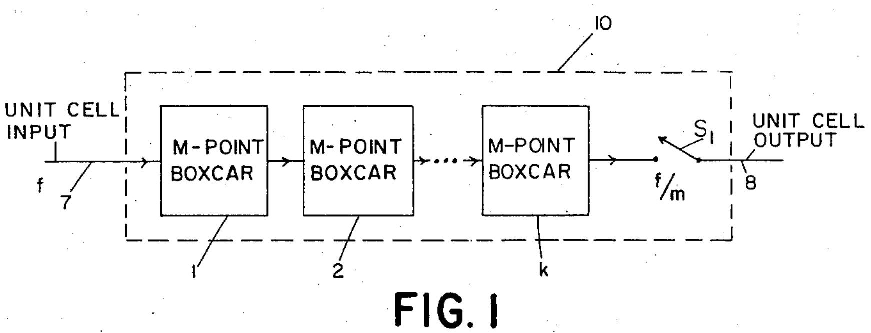
FIG. 1 is a schematic representation, partially in block-diagram form, showing a unit cell made up of a plurality of boxcar integrators and a switch between the output of the last integrator and the output of the cell.
Figure 2:
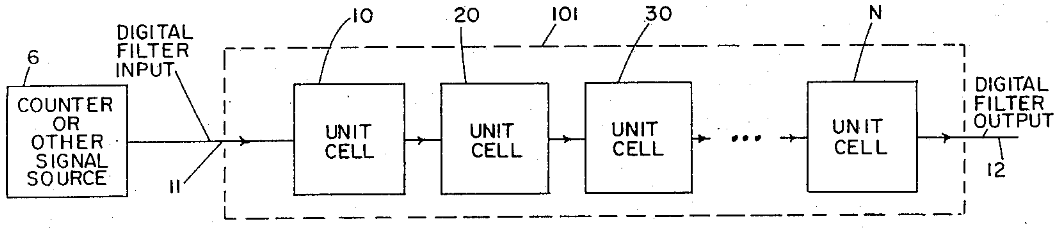
FIG. 2 shows, in block diagram form, a plurality of unit cells connected in cascade to form a digital filter.

Turning now to FIG. 2, a digital filter is shown at 101 comprising a plurality of unit cells 10, 20, 30 . . . N connected in cascade. Each unit cell, as shown in FIG. 1, comprises a duplicating filter that consists of a plurality of M-point boxcar integrators 1, 2 . . . *k* connected in cascade, and a switch $S_1$. (The term "duplicating filter" is used herein to denote elements that include a cascade of boxcar integrators, like 1, 2 . . . *k*, as well as other filter devices.) The switch $S_1$ is connected between the last boxcar integrator *k* of the cascade in a unit cell and the output of that cell. Each unit cell of the filter has the same number of boxcar integrators and each boxcar integrator within a particular cell always has the same length. The switch means $S_1$, connected as it is at the output of the cell 10, operates to reduce the data rate to a sub-multiple (f/m) of the input rate (designated *f*) to the unit cell of which it is a part, the sub-multiple being a function of the parameter R, where R equals to the number of points (*m* in FIG. 1) in the boxcar integrator impulse response of the unit cell of which the integrator is a part. To eliminate confusion the input port to the unit cell 10 is designated 7 in FIG. 1 and the output port is designated 8; and the input port to the digital filter 101 from a counter or other signal source 6 in FIG. 2 is labeled 11 and the output port thereof is labeled 12. Connecting the switch $S_1$ at the output of the unit cell 10 serves to reduce the data rate in the course of its operation to some submultiple of the input data rate to the unit cell. It is mentioned in later paragraphs, that the switch can be connected between the input 7 to the unit cell 10 and the first boxcar integrator 1 to increase the data rate, in those situations in which an increase is needed. In both situations, however, the total change in data rate is accomplished by a plurality of smaller changes which are characterized herein by the term "in the course of operation."

Figure 7:
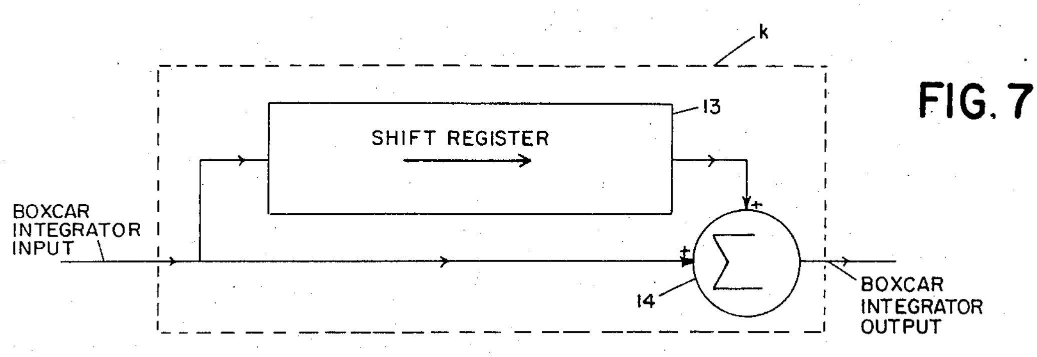
FIG. 7 shows, in block diagram form, a typical realization of a boxcar integrator, which employs a single shift register and adder.

In the preceding paragraph, the explanation was made around unit cells containing boxcar integrators, but the digital filter, broadly contemplated, can employ other duplicating filters, as well. The cascade of boxcar integrators, however, appears to be the type of duplicating filter best suited for present purposes. Various forms of boxcar integrators can be employed, one such being shown in FIG. 7 (where it is designated *k* to represent, for example, any one of the boxcar integrators 1, 2 . . . *k* in FIG. 1) comprising a shift register 13 and an adder 14. A boxcar integrator of this type can be used only for rate reduction of two, i.e., the impulse response has two points.

Figure 8:
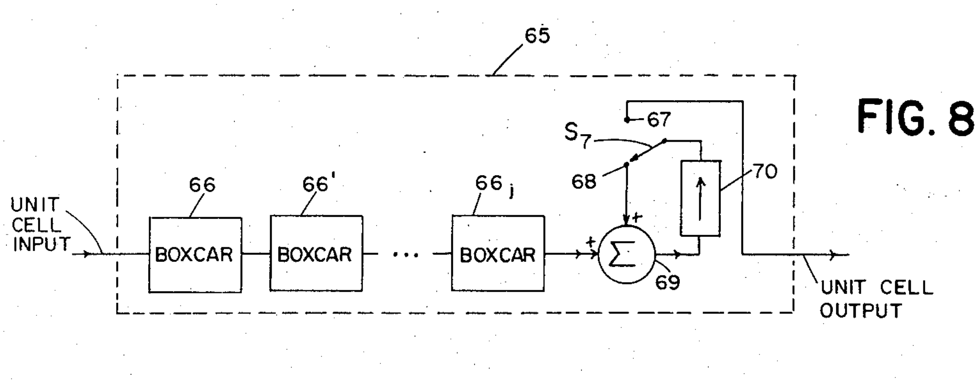
FIG. 8 shows, in block diagram form, a modification of the unit cell of FIG. 1.

The unit cell designated 65 in FIG. 8 comprises a plurality of boxcar integrators **66, 66' . . . 66*j* connected in cascade, the final boxcar integrator in the unit cell being combined with an output switch means $S_7$. Referring briefly to the explanation in connection with FIG. 1, when the switch $S_1$ is in the closed position, the analogous position of the switch $S_7$ in FIG. 8 is in the up position; i.e., in contact with the point numbered 67. When the switch $S_1$ is open, the corresponding position of the switch $S_7$ is at 68. The adder labeled 69, the shift register labeled 70 and the switch $S_7$ between the boxcar integrator $\mathbf{66}_j$ and the output from the cell 65** are an integrate and dump circuit (i.e., said final boxcar integrator).

Figure 9:
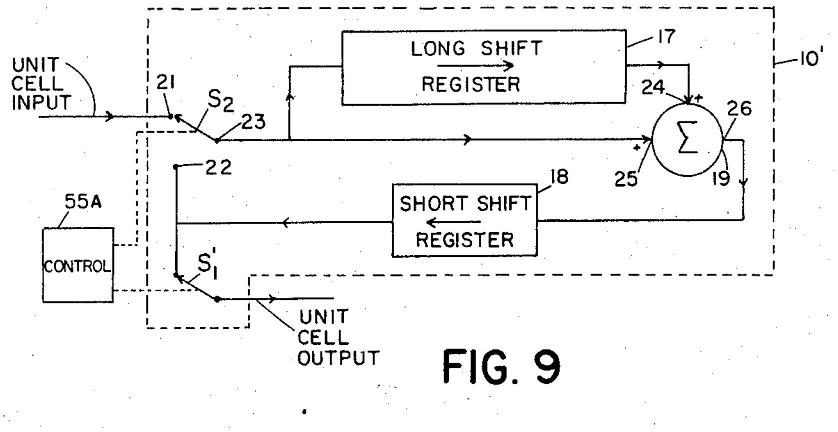
FIG. 9 shows, in block diagram form, a modification of the unit cell in FIG. 1, in which the shift registers are incorporated into a single long shift register.

The unit cell 10' in FIG. 9 comprises a long shift register 17, a short shift register 18, an adder 19, and further switch $S_2$. (The arrows in this and the other figures herein indicate the direction of information flow.) The further switch $S_2$ has two inputs or positions labeled 21 and 22 and an output 23. The output 23 is connected, as shown, to permit an input to the switch $S_2$ to enter the adder 19 and the long shift register 17 as an input to each. The adder 19 is shown having two inputs 24 and 25, one of which is the input to the long shift register 17 and the other of which is the output of the long shift register 17. The output 26 of the adder 19 is connected as the input to the short shift register 18 and the output of the short shift register is connected to the other input 22 of the switch $S_2$ and also to the designated switch $S_1'$ of the unit cell 10'. The switch $S_1'$ performs the identical function of the switch $S_1$. Both of the switches $S_1'$ and $S_2$ are controlled by a control element 55A. The sequence of operations is given in the next paragraph.

While a number is entering the input to the unit cell 10', the switch $S_2$ is in the position 21. At that time the number emerging from the long shift register 17, is the previous input number, and therefore, the output of the adder 19 is the result of filtering the input by a two-point boxcar integrator. This result is stored in the short shift register, and the switch $S_2$ then goes to the position 22. The next number to emerge from the long shift register is the previous value of the result of filtering the input by a two-point boxcar integrator, and this is added to the number emerging from the short shift register 18, which is the most recent value of the result of filtering the input by a two-point boxcar integrator. Therefore, the output of the adder 19 is the result of filtering the input by a cascade of two two-point boxcar integrators. This process continues until the most recent input is about to emerge from the long shift register 17, at which time operation of the shift register stops. The number stored in the short shift register 18 is then the result of having filtered the input by a cascade of $k$ two-point boxcar integrators, where $k$ is the number of words in the long shift register. When the next input number arrives, and the switch $S_2$ returns to position 21, the number stored in the short shift register 18 is either transmitted to the output of the unit cell 10', or lost, depending upon whether the switch $S_1'$ is closed or open, respectively. The control element 55A closes $S_1'$ during every other time that a number arrives at the input to the unit cell 10'. There must be sufficient time between the arrival of numbers at the input for all the operations described above to be completed on one input number before the next one arrives. This condition is easily satisfied in practice.

Figure 4:
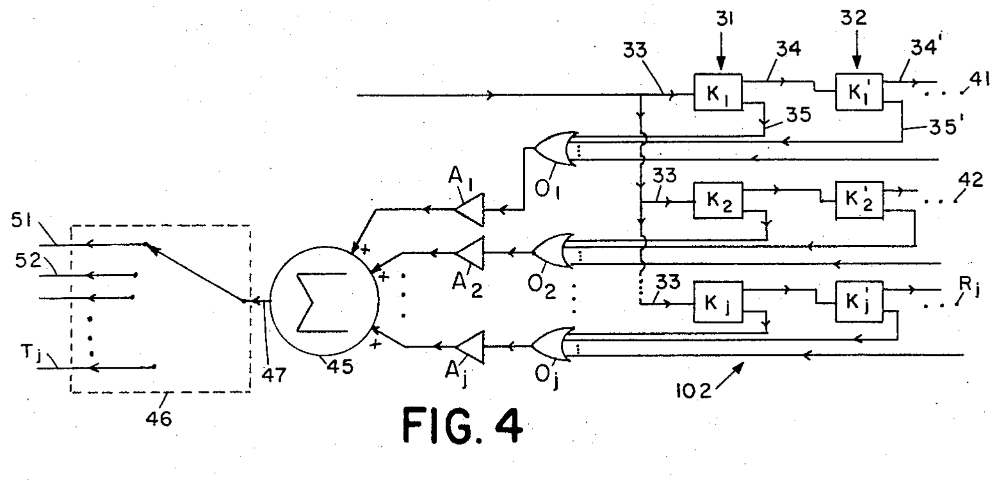
FIG. 4 shows a plurality of the modified unit cells of FIG. 3 connected to form a bank of bandpass filters.
Figure 5:
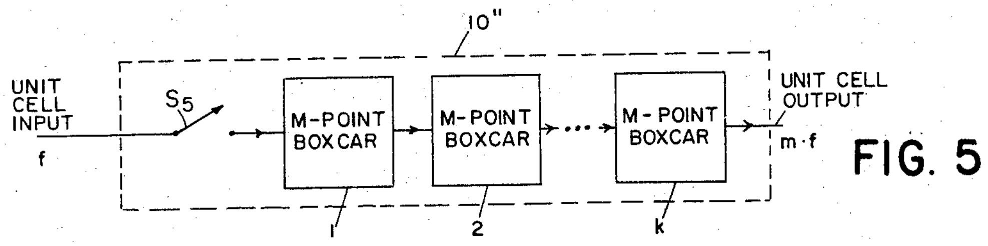

The unit cells discussed above in connection with FIGS. 1, 4 and 8 connected together to form a digital filter act to reduce the data rate by a sub-multiple determined by the parameter R; the unit cell discussed in this paragraph in connection with FIG. 5 can be connected together with like cells to form a digital filter which increases the data rate to a multiple of the input rate, the multiple, again, being a function of the parameter R. Whereas decreasing the data rate acts to form a weighted average of a time-series of input numbers, increasing the data rate acts to interpolate between numbers in a time-series. The parameter R is a term of art, which is discussed in great detail in said thesis; it is the number of points in the boxcar integrator impulse response when the duplicating filter is composed of boxcar integrators, and the data rate is either reduced or increased as a function of R depending upon whether the switch in the unit cell is placed respectively ahead of or following the boxcar integrators that compose the digital filter. The increase in data rate is accomplished by placing a switch $S_5$ (like the switch $S_1$), between the input to the unit cell labeled 10'' and the input to the first boxcar integrator 1 of the cascade of such integrators in the cell 10''. The boxcar integrators are like those previously discussed in connection with FIG. 1. The arrangement in FIG. 5 operates upon a time-series of numbers having an input data rate which is again labeled $f$ to provide an output $m.f$, wherein $m$, again, is the number of points in the boxcar impulse response. The switch $S_5$ transmits each input number once and for the next $m-1$ times of the output sequence it transmits zero; therefore, the data rate is increased.

Figure 3:
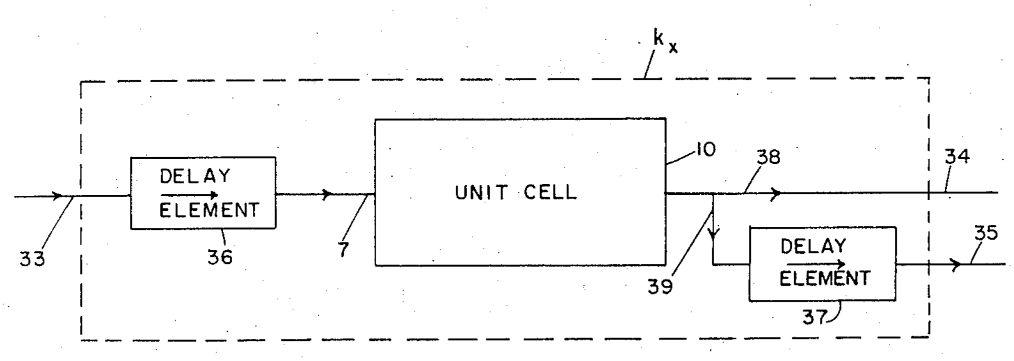
FIG. 3 shows, in block diagram form, a modified unit cell.
Figure 6:
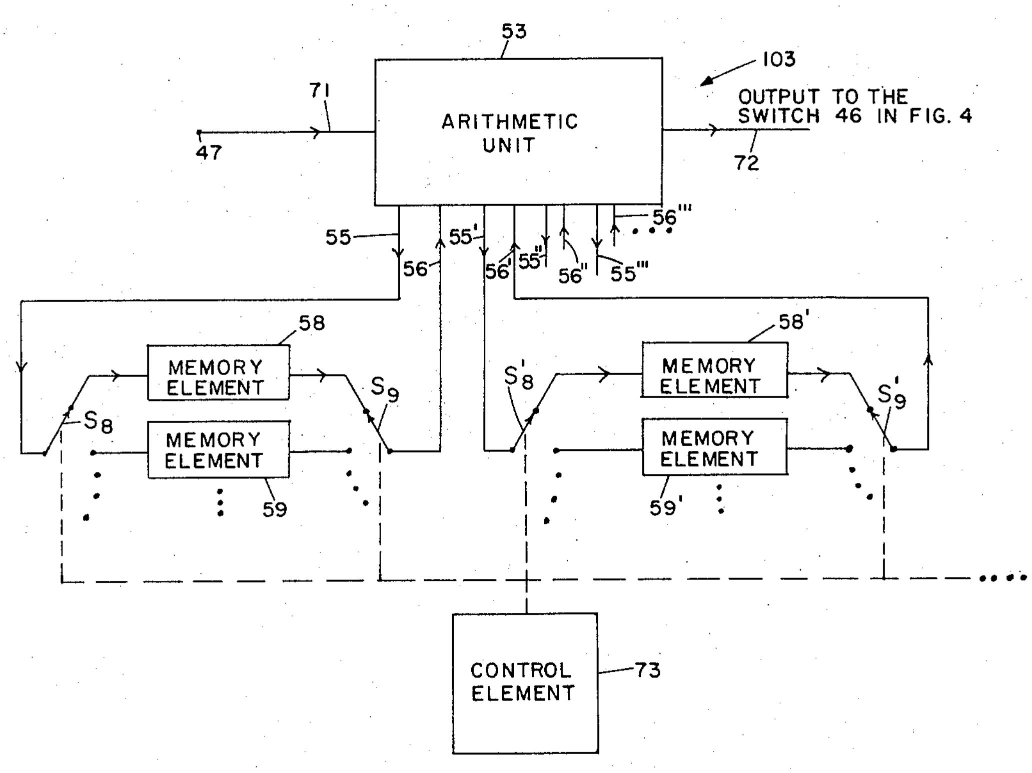
FIG. 6 shows, in block diagram form, a conventional digital filter modified by the use of multiplexed memory elements.

The system shown at 102 in FIG. 4 is again a digital filter, but here the input data is operated upon in a slightly different fashion between the system input and output. The digital filter 102 acts as a bank of bandpass filters and comprises a plurality of columns 31, 32 etc. each made up of modified unit cells $k_1, k_2 \ldots k_j$ and $k_1', k_2' \ldots k_j' \ldots$ The modified unit cells are also arranged in rows 41, 42 . . . $R_j$ respectively, consisting of cells $k_1$–$k_1' \ldots, k_2$–$k_2' \ldots k_j$–$k_j' \ldots$, thus making up a matrix of columns and rows. (The modified unit cells $k_1$, $k_1'$ etc. in a row are identical to each other, but the modified unit cells $k_1, k_2 \ldots k_j$ in a column are never alike.) One modified cell, the cell $k_x$, is shown in FIG. 3 comprising a unit cell 10, like that shown in FIG. 1 and discussed previously herein, and delay elements 36 and 37. (The cell $k_x$ represents any one of the cells $k_1, k_2 \ldots k_j, k_1', k_2' \ldots k_j'$, etc.; but it will be kept in mind that the magnitude of delay in the delay elements differ from row-to-row as noted above, e.g., the delay in the cell $k_1$ in the row 41, the delay in the cell $k_2$ in the row 42.) The cell $k_x$ has an input 33 and first and second outputs 34 and 35, respectively. (It is believed that the operation of the digital filtering system 102 can be explained by reference to the modified unit cells $k_1$ and $k_1'$. As shown, all the information into the inputs 33 of the modified unit cells in the column 31 is the same.) Within the cell $k_x$, the output of the unit cell 10 is divided into two circuits 38 and 39 to form said first and second outputs. The first delay element 37 is serially connected in the circuit 39 forming the second output 35 and the second delay element 36 is serially connected between the input 33 to the modified unit cell and the input, again labeled 7, to the unit cell 10 therein. The first output 34 from the modified unit cell $k_1$, (also labeled 34) is connected as an input to the next modified unit cell $k_1'$ of the row 41, the output 34' of which is connected as the input to the next modified unit cell of the row 41, etc. (Similar remarks apply to the rows 42 . . . $R_j$.) The second output (also labeled 35), which is delayed by delay elements like the elements 36 and 37, is connected as an input to an OR circuit $O_1$, which is one of a plurality of OR circuits $O_1, O_2 \ldots O_j$. As can be seen in FIG. 4, another input to the OR circuit $O_1$ is the second output labeled 35', of the modified unit cell $k_1'$, additional inputs to the OR circuit $O_1$ being the further second outputs of the modified unit cells making up the row 41. The inputs to the OR circuits $O_2 \ldots O_j$ are similarly derived from the rows 42 . . . $R_j$, respectively. The outputs of the OR circuits $O_1, O_2 \ldots O_j$ are connected as inputs to multipliers $A_1, A_2 \ldots A_j$, respectively, the outputs of which are connected as inputs to an adder 45. The output 47 of the adder 45 is connected to an output switch 46 having one input and a plurality of outputs 51, 52 . . . $T_j$, the number of switch outputs being equal to the number of modified unit cells $k_1, k_1' \ldots$ in a row and all of the rows having the same number of modified unit cells. There are situations, however, as discussed in later paragraphs, when a modified conventional filter 103 in FIG. 6 is connected between the output 47 of the adder 45 and the input of the switch 46; but first there follows further comments about the system 102.

The characteristics of the bank of bandpass filters 102 are discussed in this and the next two paragraphs, it being here noted that the modified unit cells $k_1, k_2 \ldots k_j, k_1', k_2' \ldots k_j' \ldots$ making up the system 102 have low-pass frequency response. At least one of the coefficients, (i.e., the multipliers $A_1, A_2 \ldots A_j$) is negative, and the bandpass frequency response is obtained as the difference between two lowpass frequency responses.

To shift the center of symmetry of the impulse response of one of the lower order filters to coincide with that of the highest order filter, the appropriate delay (36 in FIG. 3) is added to the input of each of the unit cells in the lower order filter. This is most easily accomplished when all the filters are of even order or if all the filters are of odd order. In this context the order of the filter is the number of boxcar integrators in the unit cell.

Because the output of a duplicating filter in the system of FIG. 4 is a burst at a sub-multiple, ordinarily two, of the input rate, a single set of coefficients and summing junction can process all outputs from an arbitrarily long filter chain. No two output bursts will coincide if the output from each stage to the coefficients and summing junction is delayed by one period of the input to that stage, by the delay element 37 in FIG. 3 without delaying the output 34 to the next stage.

Turning now to FIG. 6, the modified conventional filter 103 is shown comprising an arithmetic unit 53 and a plurality of sets of memory elements 58, 58' . . . , 59, 59' . . . , etc. Each set of memory elements (e.g., the set 58, 58' . . . ) corresponds to an input to each OR circuit $O_1, O_2 \ldots O_j$ and is selected to function when a signal is being transmitted to the corresponding inputs to the OR circuits. The sets of memory elements, as selected by switches $S_8$ and $S_9$, $S_8'$ and $S_9'$ . . . under the control of a control element 73 receive inputs from 55, 55' . . . which are all output of the arithmetic unit 53 and transmit data to inputs 56, 56' . . . of the arithmetic unit. The outputs 55, 55' . . . and also an output 72 of the arithmetic unit 53 are linear functions of the inputs 56, 56' . . . and an input 71 from the adder 45. Details of these linear functions are determined upon the basis of required frequency response of the modified conventional filter 103 and are not needed for purposes of the present explanation, but reference may be made to a book entitled "Digital Processing of Signals" (Gold and Rader) published by McGraw Hill Publishing Company, 1969.

Thus, the digital filter such as, for example, the filter 101 is adapted to receive as input a time-series of numbers and to act upon the numbers to produce as output a time-series of numbers whose data (sampling) rate differs from the data (sampling) rate of the input time-series, that is, the output sampling rate is a sub-multiple (or a multiple if the unit cells 10 . . . in FIG. 2 are replaced by the unit cells 10'') of the input data rate, where the ratio of rates is determined by the sampling rate change R of each of the unit cells making up the filter 101. The filter 101 comprises a cascade of unit cells 10 each of which is adapted to act upon a time series of numbers and to produce an output data rate which differs from the input data rate. Here the output data rate is a sub-multiple of the input data rate, but if the cells 10'' are used the output is a multiple of the input, as before discussed. The high rate port 7 of each of the unit cells 10 . . . (the high rate port of the cells 10'' in FIG. 5 is the right-hand port) is connected to the port of the same kind of the duplicating filter comprising boxcar integrators 1 . . . (i.e., the input port of the duplicating filter). The switch $S_1$ (or $S_5$, as the case may be) is connected in series with the duplicating filter and between it and the low-rate port 8 of the unit cell 10 (or the left hand port of the unit cell 10''). The digital filter 101 is, therefore, made up of a plurality of duplicating filters which alternate one-by-one with the switches $S_1$ . . . (i.e., there is alternately a duplicating filter, then a switch, then a duplicating filter, etc. in the digital filter 101). The cascade of unit cells, therefore, necessarily has a duplicating filter at one end (e.g., the input 11) and a switch at the other end (e.g., the output 12).

Modifications of the invention will occur to persons skilled in the art and all such modifications are considered to be within the spirit and scope of the invention as defined in the appended claims.

What is claimed is:

1. A digital filter having, in combination, a plurality of unit cells connected in cascade, each unit cell comprising a plurality of digital boxcar integrators connected in cascade and switch means serially connected between the output of the last boxcar integrator of the cascade in a unit cell and the output of that cell, each unit cell of the filter having the same number of boxcar integrators and each boxcar integrator within a particular cell having the same length, the switch means acting to reduce the data rate to a sub-multiple of the input data rate to the unit cell of which it is a part, data being transmitted from the output of said switch means at said sub-multiple rate, the sub-multiple being equal to the number of points in the boxcar integrator impulse response of the unit cell of which it is a part.

2. A digital filter as claimed in claim 1 in which the boxcar integrators each comprise at least one shift register and one adder.

3. A digital filter having, in combination, a plurality of unit cells connected in cascade, each unit cell comprising a long shift register, a short shift register, an adder, first switch means, and further switch means, said further switch means having two inputs and one output connected to permit an input number to enter the adder and the long shift register, the adder having one of its inputs connected to the input to the long shift register, the other input to the adder being connected to receive the output of the long shift register, the output of the adder being connected as the input to the short shift register and the output of the short shift register being connected to one input of the further switch means and also through the first switch means to the output of the unit cell, the unit cell input being connected to the other input of the further switch means.

4. A digital filter having, in combination, a plurality of unit cells connected in cascade, each unit cell comprising a plurality of digital boxcar integrators connected in cascade and switch means serially connected between the input to the unit cell and the input to the first boxcar integrator of the cascade in a unit cell, each unit cell of the filter having the same number of boxcar integrators and each boxcar integrator within a particular cell having the same length, the switch means acting to increase the data rate to a multiple of the input data rate to the unit cell of which it is a part, data being transmitted from the output of said switch means at said multiple data rate, the multiple being equal to the number of points in the boxcar integrator inpulse response of the unit cell of which it is a part.

5. A digital filter adapted to act upon a time series of numbers to effect a total change in the data rate of the numbers as a plurality of smaller changes and having, in combination, a plurality of unit cells connected in cascade, each unit cell comprising a plurality of digital boxcar integrators connected in cascade, each unit cell having the same number of digital boxcar integrators in cascade and each digital boxcar integrator within a unit cell having the same number of points in its impulse response, and switch means, the switch means being connected in series with the cascade of boxcar integrators to provide an output data rate from each unit cell that differs from the input data rate to that particular cell, the combined changes in data rate of the cascade of unit cells being said total change in data rate.

* * * * *